(No Model.)

W. H. SHAW.
SPEED MEASURE FOR VEHICLES.

No. 558,315.  Patented Apr. 14, 1896.

Witnesses:
J. Staib
Chas. H. Smith

Inventor:
William H. Shaw
per Lemuel W. Serrell
Atty.

UNITED STATES PATENT OFFICE.

WILLIAM H. SHAW, OF BROOKLYN, NEW YORK.

SPEED-MEASURE FOR VEHICLES.

SPECIFICATION forming part of Letters Patent No. 558,315, dated April 14, 1896.

Application filed June 24, 1895. Serial No. 553,832. (No model.)

*To all whom it may concern:*

Be it known that I, WILLIAM H. SHAW, a citizen of the United States, residing at Brooklyn, in the county of Kings and State of New York, have invented an Improvement in Speed and Distance Meters, of which the following is a specification.

In the propulsion of cars, especially those driven by electricity and in cities, it is important that the motorman should be able to constantly appreciate the speed of the movement of the car, so as not to exceed the speed allowed by law; and bicycle-riders also require an indicator, so as to know whether the regulation speed is being exceeded.

The object of the present invention is to furnish a reliable indication of the speed of movement of a car, bicycle, or other vehicle; and with this object in view I provide a clock-work having a hand revolving at a definite speed and a second hand that is driven by a connection to the car-wheel or other motor, and there is between the second hand and its motor conical pulleys and a movable friction-wheel by which the motion given to one of the conical pulleys is communicated to the other of such conical pulleys and to the hand therewith connected, and by adjusting this movable friction-pulley between the two conical pulleys the speed of the hand that is driven by the connection to the car or other wheel can be so regulated as to correspond to the motion given to the hand by the clockwork when the vehicle is being propelled at the legal or regulation speed, and the relative movements of the two hands will indicate to the rider or motorman whether the speed-hand is moving faster or slower than the clockwork-hand; and I find it is advantageous to make the clockwork-hand with four or more radial projections, so that the speed-hand may be sufficiently near the time-hand for the driver or motorman to readily appreciate which one may be gaining upon the other and thereby regulate the speed of travel accordingly.

Figure 1:
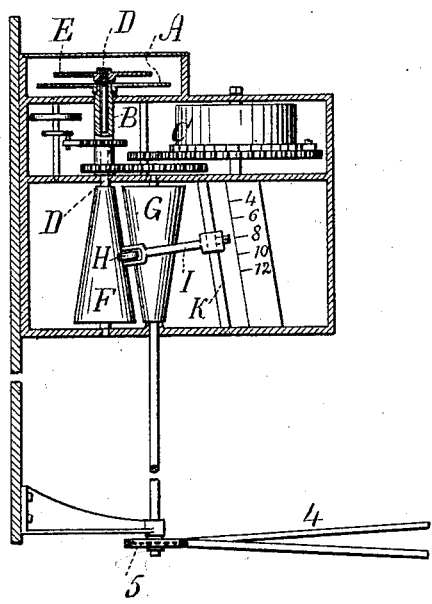
Figure 2:
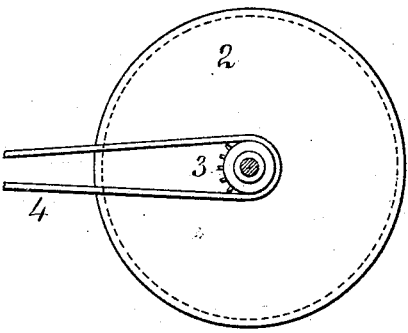
Figure 2:
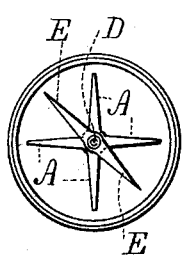

In the drawings, Figure 1 is a sectional elevation representing the conical drums and their connection with the speed-hand and motor, respectively, and the clockwork-hand; and Fig. 2 is a plan view of the dial, showing the time-hand and the speed-hand one above the other.

The time-hand A is of any desired character. I prefer to make the same with four or more radial arms, and this time-hand is on a tubular spindle B, and the same is rotated at a uniform speed by any suitable mechanism. I have illustrated a clock mechanism at C, and through the tubular spindle B is an arbor D, carrying the speed-hand E, and the arbor D carries or is connected with the conical drum F, and adjacent to this is a similar conical drum G, which receives rotation by any suitable connection to the car wheel or axle or to the wheel or axle of any other vehicle.

I have indicated at 2 a car-wheel with a sprocket-wheel 3 and chain 4 to a sprocket-wheel 5 upon the arbor of the drum G. The friction-pinion H is on a movable arm I, suitably supported, and preferably by a rod K, so that such pinion H and arm I can be raised or lowered for bringing the friction-pinion H into contact with the surfaces of the conical drums F and G at any desired point along the length of such drums; and it will be observed that by the use of these conical drums the speed of the hand E in relation to the speed of the car or other wheel 2 can be varied and easily regulated.

The parts are to be so adjusted that when the car or other vehicle is traveling at the proper or maximum speed the speed-hand E and time-hand A will revolve synchronously or substantially so, and when the motorman or rider notices that the time-hand is moving faster than the speed-hand the visual indication denotes that the speed of the vehicle can be increased. If on the other hand the speed-hand E is moving faster than the time-hand A, the notice is given thereby to slacken the speed.

After the respective speed of the time-hand and of the speed-hand have been observed or calculated the friction-pinion H can be adjusted so that the speed-hand will travel with the time-hand when the vehicle is running at the maximum speed, and an indicator can be provided, so that by setting the friction-pinion H according to such indicator the two hands will move together when the vehicle is running at the speed denoted on the indicator, and this maximum speed may be varied according to the limit of speed that may be legally decided upon. There will therefore be no excuse for the motorman or driver when the vehicle is moving at too great a speed, because the safe and legal speed will be indicated by the two hands moving together.

I claim as my invention—

1. The combination with a time-hand and mechanism for driving the same at a regular speed, of a speed-hand and a shaft for carrying the same adjacent to the time-hand, conical drums connected respectively with the speed-hand and the wheel or shaft of the car, bicycle or other vehicle, and a movable friction-pinion for giving motion to one conical drum from the other, substantially as set forth.

2. The combination with a time-hand and its tubular spindle and clock mechanism, of an arbor passing through the tubular spindle, a speed-hand upon such arbor adjacent to the time-hand, conical drums one of which is connected with the speed-hand, a connection to the wheel of the vehicle for driving the other conical drum, a friction-pinion between such conical drums and mechanism for holding and adjusting the same to vary the relative speed of the speed-hand and time-hand, substantially as set forth.

Signed by me this 21st day of June, 1895.

WILLIAM H. SHAW.

Witnesses:
GEO. T. PINCKNEY,
S. T. HAVILAND.